May 6, 1947.  J. G. WALLACE  2,420,272

LOCKING DEVICE

Filed July 3, 1945

Inventor
John G. Wallace
By Frederick C. Bromby
ATTY

Patented May 6, 1947

2,420,272

UNITED STATES PATENT OFFICE 2,420,272

LOCKING DEVICE

John G. Wallace, Toronto, Ontario, Canada

Application July 3, 1945, Serial No. 602,994

4 Claims. (Cl. 287—114)

My invention relates to locking devices adapted for frictionally securing interfitting members against relative movement, and concerns a device of this character which is of general utility.

It is however a particular object of the present invention to provide a locking device by which telescopic members may be clamped in any position of adjustment. The invention is admirably suited for locking a telescopic leg of a table so that the telescoping elements are clamped together when positionally adjusting the table-top.

Another object is to furnish a locking device adapted to clamp a rotatable member on a shaft so that it may be readily removed or adjusted in accord with circumstances of use. The locking device in this instance takes the place of a key or similar locking means of a positive type.

The objects of the invention are attained by a locking device comprising a circular wedge carried by an annular member for encompassing an inner member, and a ring loosely sleeved on the annular member having an internal wedge arranged so that when the ring is turned in one direction it will urge the circular wedge to bind the annular member on the inner member. The annular member is releasable by reverse movement of the ring. The ring is fashioned as a grip element suited to be manually turned.

The invention is illustrated in the accompanying drawing, in which Figs. 1 through 5 illustrate the locking device fashioned as a clamp for securing telescopic members.

In these views

Figure 1:
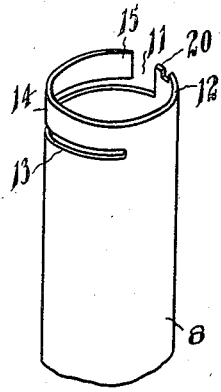
Fig. 1 shows the circular wedge on the annular member.
Figure 2:
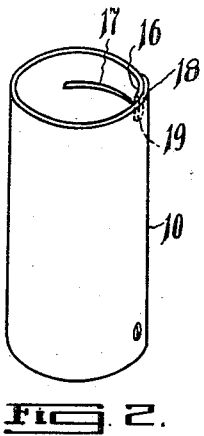
Fig. 2 depicts the ring with its internal wedge.
Figure 3:
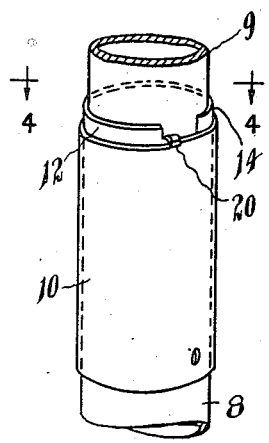

Fig. 3 delineates the assembly of the annular member, the inner member and the ring.

Figure 4:
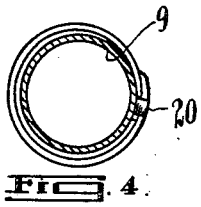

Fig. 4 is a cross section on line 4—4 of Fig. 3.

Figure 5:
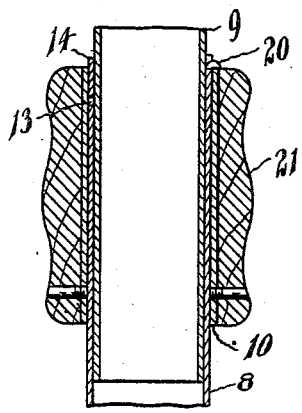

Fig. 5 is a longitudinal section of the assembly and showing the ring provided with a hand grip.

Figure 6:
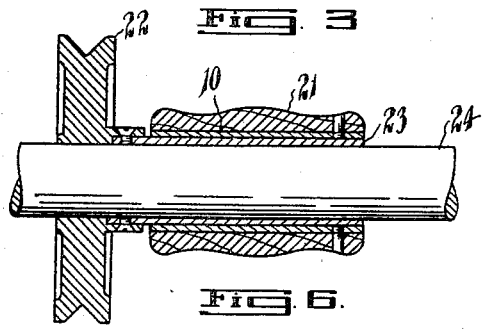

Fig. 6 is a similar view to Fig. 5, but illustrates the variant form of the invention in which the locking device secures a rotatable member on a shaft.

In describing the invention reference will first be had to Figs. 1 to 5 of the drawing wherein the locking device is of a character for securing telescopic parts in any extensile position to which they may be adjusted. The telescopic parts may be those constituting a leg of a table of a known type in which the extensile leg enables the top to be elevated and/or set at different inclinations.

The lower member of such a leg is ordinarily a tubular member upstanding from a base and has the upper member telescopically fitted in it. Said lower member is denoted by the reference numeral 8 and is of a cylindrical cross section formed of seamless tubing having a thin wall. The upper member, denoted at 9, is also tubular and of a similar cross section. The upper member is the inner part of the telescopic connection and extends for a suitable distance in the lower or outer member 8 as will be well understood in the art.

The ring, denoted 10, is a circular member loosely sleeved on the outer member 8 to turn freely. Said outer member is supplied with a slot 11 extending inwardly from its upper edge 12 for a short distance and is also supplied with a slot 13 extending circumferentially to merge into the slot 11 and thus provide a wedge piece 14 by the partly severed section. The wedge piece extends circularly about the inner member 9 and is attached at its base to the outer member. It is tapered toward its free end 15 and due to the inherent springiness of the material is capable of being sprung into clamping engagement with the inner member 9.

The ring 10, which is a metal element, is supplied with a rigid internal wedge 16 curved inwardly and extended circumferentially to fit over the resilient wedge 14. The wedge 16 is integrally fashioned on said ring as by slotting a section of the wall, as at 17, to partly sever a portion of it and then bending the section inwardly and welding its free end to the adjacent metal as indicated at 18. In assembling the ring on the member 8 the end of the wedge 16 is placed in the slot 11 and its side edge 19 engages the adjacent edge face of the slot 13 which shoulders the ring against sliding downwardly. A suitable expedient may be employed to shoulder the ring against upward displacement. For instance a finger 20 may be cut from the material of the member 8 to project upwardly at its edge 12. The finger is bent radially after the ring is in applied position, which serves to lock the ring in place.

It will be manifest by this construction that when the ring is turned toward the free end 15 of the flexible wedge 14 the rigid wedge 16 will urge that wedge to bind on the inner member 9 to lock it to the outer member 8. A reverse movement frees the telescopic members.

For convenience in turning the ring it is supplied with a suitable handle or grip. Preferably a grip element is provided as shown at 21 which may be easily grasped by the hand. Said grip element may be made of wood or other material and is secured to the ring in approved manner.

As represented in Fig. 6, the locking device may be used to secure a member on a shaft to rotate therewith. The member, denoted at 22, may be a pulley or other power transmitting agent; in which case it would be provided with a hub piece 23 integral or secured thereto in which the flexible wedge 14 is formed as aforesaid and on which the ring 10 is applied with its rigid wedge 16 and turned as by the grip element 21. The shaft, indicated at 24, corresponds to the inner member 9 aforesaid and the hub piece 23 is secured thereon by the locking device by merely turning the grip element 21 in the proper direction.

It will be understood from the preceding description that the invention provides an effective and serviceable locking device which is inexpensive to manufacture and facile of operation.

While the invention has been disclosed in a selected embodiment, it is not intended that it shall be confined to the exact details of the disclosure herein set forth, but that such changes and variations may be resorted to as come within the scope of the subjoined claims.

What I claim is:

1. A locking device for securing an outer member to a rotund inner member, comprising a cylindrical member for encircling said inner member, a yieldable wedge carried by said cylindrical member to extend circumferentially of said inner member for clamping engagement therewith, a ring sleeved loosely on said cylindrical member, means on said cylindrical member providing thrust shoulders for holding said ring against axial displacement, and a non-yieldable wedge carried by said ring for urging said yieldable wedge inwardly.

2. A locking device as defined in claim 1, in which the means for providing the thrust shoulders for holding the ring against axial displacement includes a finger-like piece of material struck up from the cylindrical member to take end thrust on the ring.

3. A locking device for securing an outer member to a rotund inner member, comprising a cylindrical member forming a unitary element of said outer member for encircling said inner member, a resilient wedge united with said cylindrical member and extended circumferentially for clamping engagement with said inner member, a ring sleeved loosely on said cylindrical member, and a wedge rigidly carried by said ring provided with an inwardly curved face for engaging said resilient wedge for effecting said clamping engagement thereof when said ring is turned in one direction; the structure being characterized in that the resilient wedge extends within the confines of the inner and the outer faces of the cylindrical member when the device is in an inoperative position.

4. A locking device as defined in claim 3, in which the resilient wedge is integrally fashioned on an end of the cylindrical member by providing a section thereof defined by a slot extending inwardly of said end and a slot extending circumferentially, and in which the rigid wedge on the ring fits into said inwardly extending slot so that the inwardly curved face of the rigid wedge will engage said resilient wedge when the ring is turned for effecting the clamping engagement.

JOHN G. WALLACE.

REFERENCES CITED

The following references are of record in the file of this patent:

UNITED STATES PATENTS

| Number | Name | Date |
|---|---|---|
| 613,766 | Hodgkinson | Nov. 8, 1898 |

FOREIGN PATENTS

| Number | Country | Date |
|---|---|---|
| 267,963 | Italian | Sept. 27, 1929 |
| 626,230 | French | May 7, 1927 |